(12) United States Patent
Richards

(10) Patent No.: US 8,030,966 B2
(45) Date of Patent: Oct. 4, 2011

(54) VERY HIGH EFFICIENCY TRANSMISSION LINE DRIVER

(76) Inventor: Ernest S. Richards, Everett, WA (US)

( * ) Notice: Subject to any disclaimer, the term of this patent is extended or adjusted under 35 U.S.C. 154(b) by 394 days.

(21) Appl. No.: 12/150,478

(22) Filed: Apr. 30, 2008

(65) Prior Publication Data

US 2009/0273412 A1  Nov. 5, 2009

(51) Int. Cl.
*H03K 19/0175* (2006.01)
(52) U.S. Cl. ............ 326/82; 326/30; 326/86; 379/398; 333/32
(58) Field of Classification Search ........... 326/82–83, 326/86; 379/398; 333/32
See application file for complete search history.

(56) References Cited

U.S. PATENT DOCUMENTS

| | | | |
|---|---|---|---|
| 3,819,877 A * | 6/1974 | Blahut et al. ............... | 379/156 |
| 6,665,399 B1 | 12/2003 | Gorcea et al. | |
| 6,788,148 B2 * | 9/2004 | Orr et al. ................... | 330/286 |
| 6,930,567 B2 * | 8/2005 | Schenk ..................... | 333/81 R |
| 7,656,167 B1 * | 2/2010 | McLean .................... | 324/637 |

* cited by examiner

*Primary Examiner* — Jason M Crawford
(74) *Attorney, Agent, or Firm* — Boswell IP Law; J. Mason Boswell

(57) ABSTRACT

This circuit is a back terminated transmission line driver which dissipates no outgoing power across its back terminating resistor by using both a voltage source and a current source.

20 Claims, 5 Drawing Sheets

VERY HIGH EFFICIENCY TRANSMISSION LINE DRIVER

CROSS-REFERENCE TO RELATED APPLICATION

Not applicable

BACKGROUND

1. Field of Invention

Constant impedance transmission lines are used to move electrical signals. A transmission line is terminated at the receiving end by a resistor whose resistance is equal to the characteristic impedance of the transmission line. This terminating resistance prevents reflection of the arriving signal. Imperfections in the transmission line also cause reflections. If the source does not have a resistance equal to the characteristic impedance of the transmission line, reflected signals, arriving at the source, are reflected toward the receiver. Reflected signals cause problems. To prevent these problems the resistance of the source is made equal to the characteristic impedance of the transmission line.

2. Description of Prior Art

A transmission line driver is a circuit that drives a transmission line having a characteristic impedance of Zo. Both the driver and receiver should have a characteristic resistance of R=Zo to minimize reflections on the transmission line. There are three prior art ways of designing a terminated line driver.

A voltage source of twice the output voltage is used in series with the driving resistor Ro. Half of the source voltage is lost in Ro and the power dissipated equals the output power. FIG. 1.

A second way is to use a current source with twice the output current and a source resistance to ground. Again, the power dissipated equals the output power. FIG. 2.

The third way is to use feedback to change the value of a resistance different from the characteristic impedance to Zo. U.S. Pat. No. 6,665,399 covers this technique.

SUMMARY

This circuit is a back terminated transmission line driver which dissipates no outgoing power across its back terminating resistor; the power dissipated is reduced by more than half.

OBJECTS AND ADVANTAGES

The advantages of this patent are
(a) Greatly reduced power dissipation in the circuit sourcing power
(b) Ease of implementation
(c) Unconditional stability

DRAWING FIGURES

In the schematics shown, identically numbered items have the same function.

Figure 1:
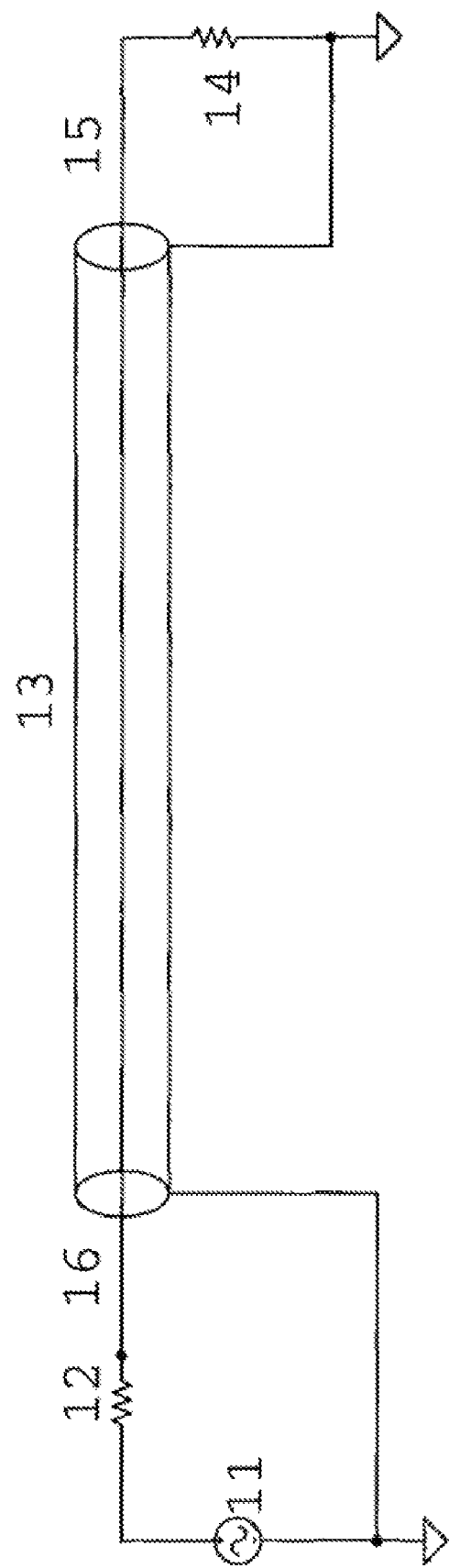
FIG. 1 is a voltage source driving a transmission line and load.
Figure 2:
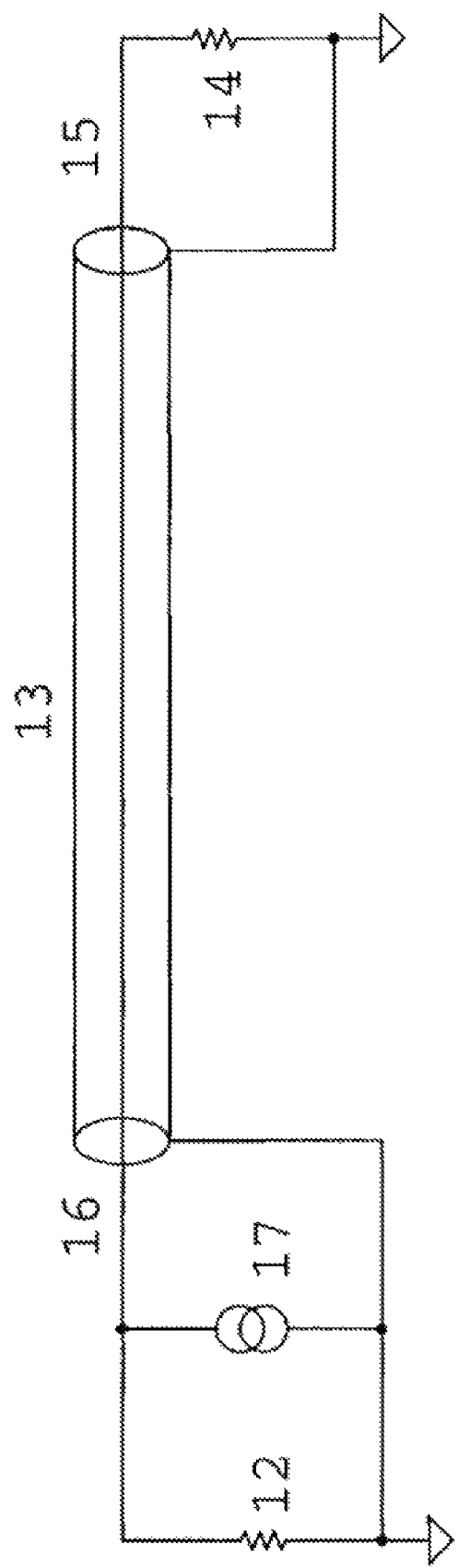
FIG. 2 is a current source driving a transmission line and load.

REFERENCE NUMERALS IN DRAWINGS 11 conventional voltage source
12 source terminating resistor
13 transmission line
14 transmission line load
15 transmission line output voltage
16 source terminated transmission line output voltage
17 controlled current source
18 and 19 conventional CMOS logic output devices
20 PMOS switching transistor
21 and 22 current mirror PMOS transistor
23 negative current input
24 NMOS switching transistor
25 and 26 current mirror NMOS transistor
27 positive current input
28 driver power source voltage
29 DC voltage source
30 Logic input
31 positive voltage source
32 positive voltage source return
33 and 34 current output device
35 and 36 output current measurement point
37 and 38 output current measurement resistors
39 and 40 source termination resistor
41 and 42 opposite polarity signal source voltages
43 coupling transformer
44 and 45 matched resistors
46 and 47 matched resistors
48 and 49 differential received voltage
50 gate drive voltage for positive output
51 gate drive voltage for negative output
52 signal sent into the DSL version of this circuit Description—FIGS. 1 and 2—Prior Art FIG. 1 is the most commonly used transmission line driver. (12) The source terminating resistor is equal to the transmission line's (13) characteristic impedance, and (14) the load resistance is also equal to the transmission line's (13) characteristic impedance. Note that half of the power supplied by the source (11) is dissipated in the source terminating resistor, as is half the voltage.

FIG. 2 is identical to FIG. 1 except that a Thevanin to Norton transformation has been made. The current source (17) replaces the voltage source of (11). Again half of the power supplied by the source (17) is dissipated in the source terminating resistor, as is half the current.

Figure 3:
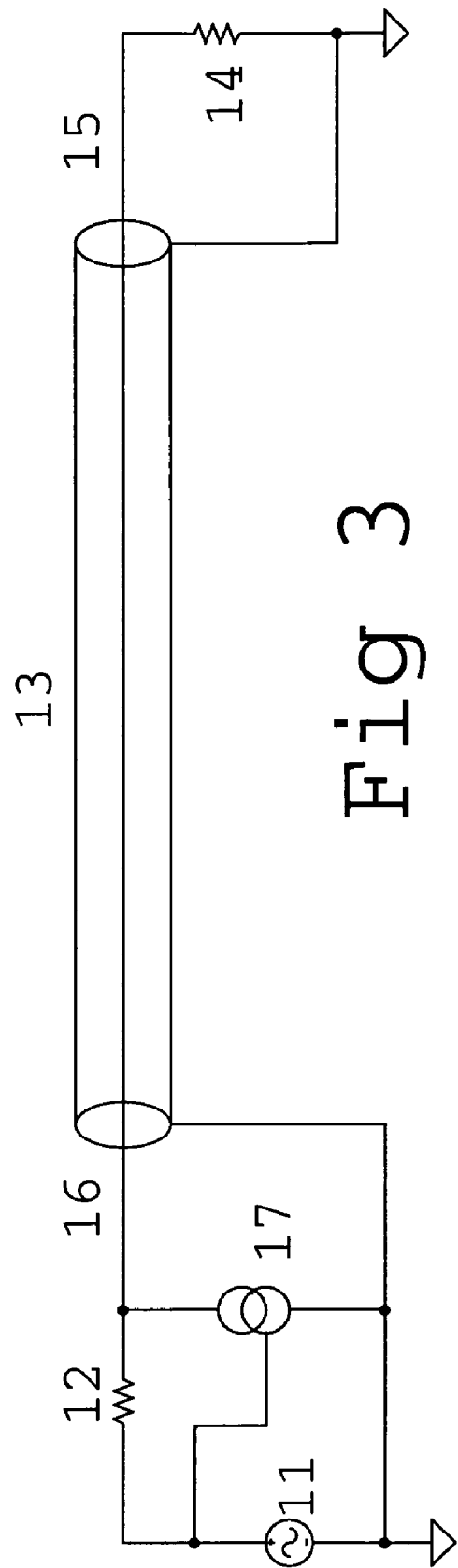
FIG. 3 is the implementation of this invention, using idealized components, driving a transmission line and load.
Figure 4:
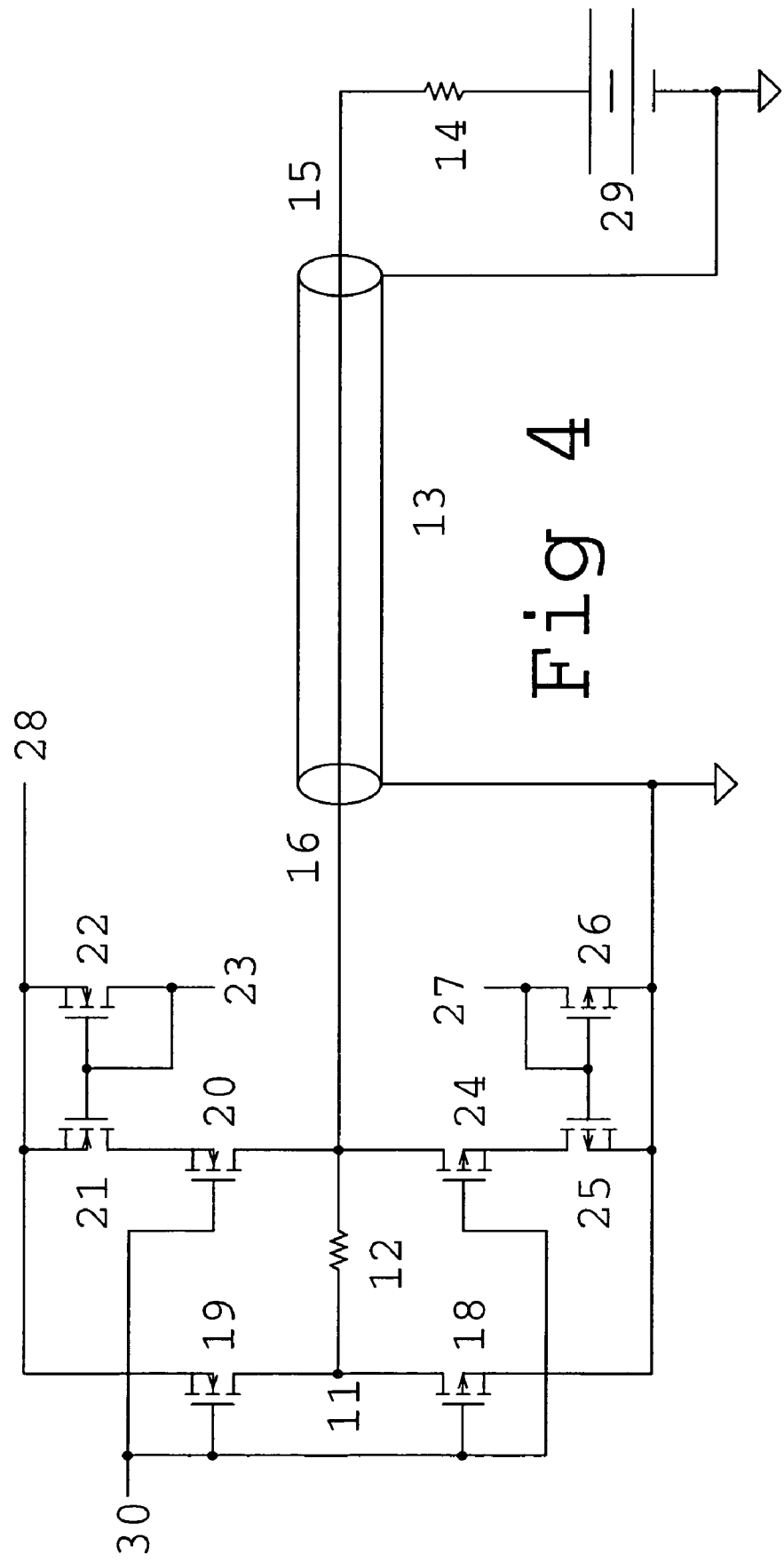
FIG. 4 is a digital CMOS implementation of this invention driving a transmission line and load.
Figure 5:
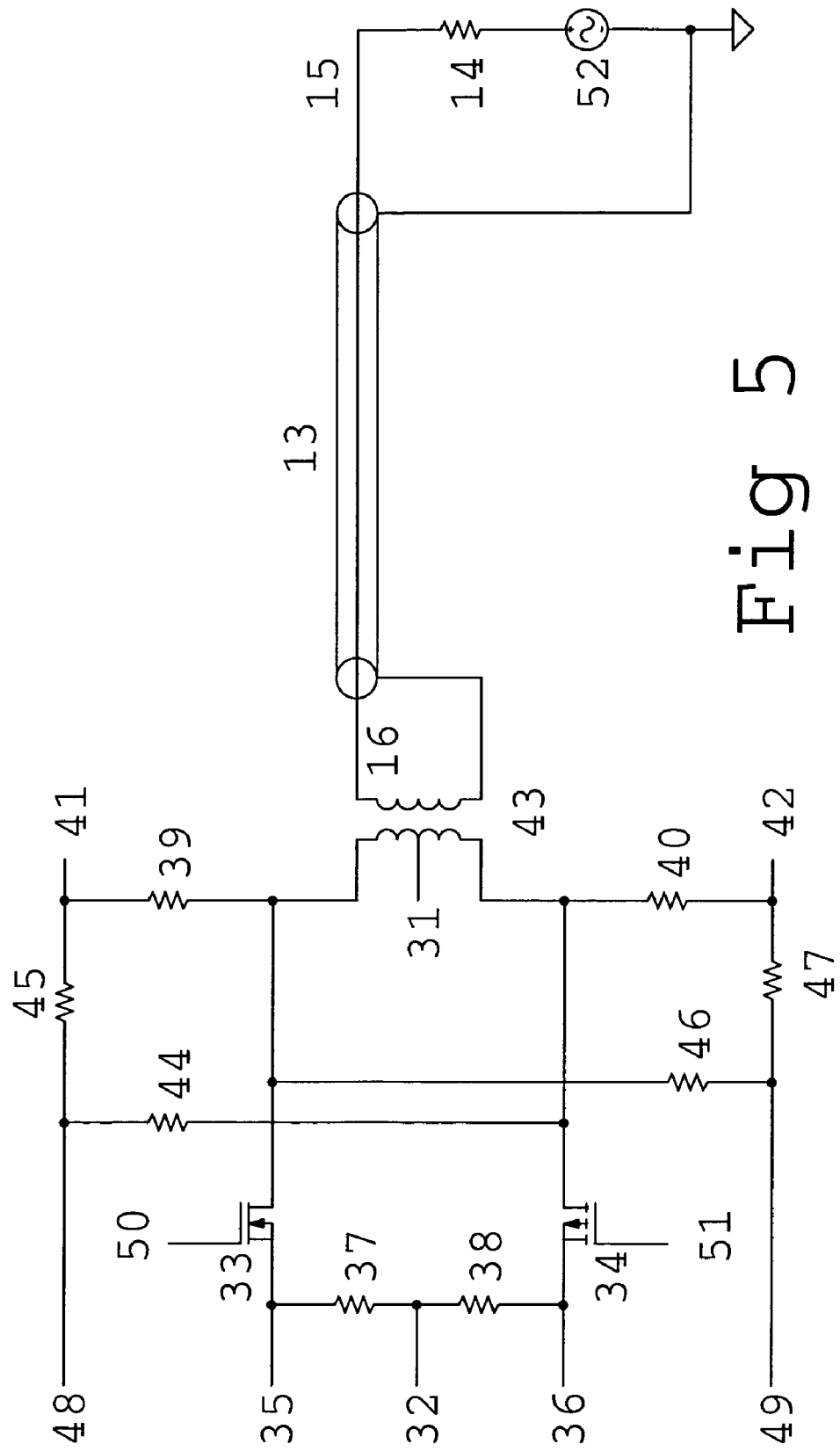
FIG. 5 shows a differential analog implementations of this invention, with a transformer driving a transmission line and load.

Description—FIGS. 3 to 5—Preferred Embodiment

FIG. 3 is the core of this invention. The principle of superposition makes the resistance looking into the source (16) equal to resistor (12). (The principle of superposition allows voltage sources be set to zero to compute the resistance.) In this invention the following relationships hold. The source terminating resistor (12) is equal to the characteristic impedance, Zo, of transmission line (13), and (14) the load resistance is also equal to the characteristic impedance, Zo, transmission line (13). The output voltage (16) is equal to the source voltage (11) and the source current (17) is equal to the source voltage (11) divided by Zo the transmission line's (13) characteristic impedance (I=E/R). When these conditions are met there is no voltage across the source resistance (12) for signals sent into the transmission line (13), but reflected signals are terminated by the source resistance (12). Thus there is no source power dissipated in the source resistance (12) for signals sent by this transmission line driver circuit, only reflected power is dissipated in (12). The current from (17) thus flows through the transmission line (13) and the load resistance (14), and, ignoring reflections, no current is drawn from the voltage source (11).

FIG. 4 is the implementation of this invention in CMOS for use in logic devices. (28) Is the positive power supply Vdd. (18) And (19) are CMOS transistors used to form a voltage source, Vdd or ground, at (11), which is equivalent to the voltage source (11). The source terminating resistor (12) and is equal to the impedance, Zo, of transmission line (13), which is also equal to the terminating resistance (14). Matched transistors (21) and (22) form a current mirror current source in which the drain current of transistor (21) is equal to the drain current from (13) of transistor (22). The drain current is (Vdd-K-V(29))/Zo, where K is the voltage required to keep transistor (21) in its linear range considering tolerances. This current source is gated onto the output of the source driver by transistor (20). A similar sub circuit (24), (25), and (24) is used as a current sink. Transistors (20), (21), (22), (24), (25), and (26) form a controlled current source equivalent to (17). (29) Is a voltage source that minimizes the power dissipated in the transmission line (13) terminating resistor (14) and is between Vdd and ground. Voltage source (29) is usually one half of (28) to minimize power dissipation but can be other voltages.

FIG. 5 is an implementation of this invention for DSL. DSL is a higher frequency digital communication system used on telephone wires, which are a transmission line. DSL sends signals in both directions, at different frequencies above the standard audio and signaling frequencies used by the standard subscriber line interface. The DSL circuit is coupled to the transmission line by band separation filters (not shown) and by transformer (43), which allows differential drive to be used. Signals are sent from this circuit to the receiver (which may, or may not be this circuit). A simple voltage source (52) is shown for simplicity. Again the transmission line is (13) and its terminating resistor is (14). The signal across the receiver terminating resistor is (15). Transistors (33) and (34) form the current source, as in (17). Resistors (39) and (40) are the source terminating resistors, equivalent to (12). The voltage difference between (41) and (42) are the source voltage, equivalent to (11). The current source transistors (33) and (34) are controlled by (50) and (51). Resistors (37) and (38) sample the output current which is proportional to the voltage difference between (35) and (36). This difference can be used for feedback to improve the performance of the transistors as current sources. Resistors (39) and (40) have no current flow through them except the signals arriving at (16) from the transmission line (13), the received signal. The received signal (42) can be recovered by canceling the sourced voltage using a pair of voltage dividers formed by (44) and (45) on one side and (46) and (47) on the other. Because the AC voltage at (40) and (41) are equal, but opposite in sign, the outgoing signal cancels when (44) equals (45) and (46) equals (47). These resistors (44), (45), (46), and (47) should be so large that they don't materially reduce the resistance of (39) and (40). The differential output between (48) and (49) is the signal received at (16) from (52) without the signal sent from (16) to (15). It does, however, contain signals reflected by imperfections in the transmission line system.

I claim:

1. An electrical circuit for efficiently driving a transmission line, the transmission line having a characteristic impedance, the circuit comprising:
    a source terminating resistive element with an output side connected to an input of the transmission line, the resistive element having an impedance substantially equal to the characteristic impedance of the transmission line;
    a voltage source having an output voltage substantially equal to a target source voltage at the input of the transmission line, wherein the voltage source is connected serially with an input side of the resistive element;
    a current source having an output current substantially equal to the output voltage of the voltage source divided by the characteristic impedance of the transmission line, wherein the current source is connected with the output side of the resistive element and drives signal current into the transmission line; and
    wherein the electrical circuit, upon coupling to the transmission line, drives an input signal into the transmission line while dissipating substantially no power across the resistive element related to the input signal and while dissipating power across the resistive element to terminate one or more reflected signals.

2. The electrical circuit of claim 1 wherein the circuit is implemented as an analog circuit.

3. The electrical circuit of claim 1 wherein the circuit is implemented as an integrated circuit.

4. The electrical circuit of claim 1 wherein the circuit is implemented with one or more discrete components and one or more integrated circuits.

5. The electrical circuit of claim 1 wherein a voltage drop across the resistive element is substantially zero for the input signal, so that substantially no current flows from the current source into the resistive element.

6. The electrical circuit of claim 1 wherein the source terminating resistive element comprises an impedance element that matches one or more non-resistive impedance characteristics of the transmission line.

7. The electrical circuit of claim 1 wherein the voltage source comprises a CMOS circuit with an output voltage equal to that of the voltage source.

8. The electrical circuit of claim 1 wherein the current source comprises a CMOS circuit with an output current equal to that of the current source.

9. The electrical circuit of claim 1 wherein the current source sources and sinks current to the transmission line synchronously with the voltage source output.

10. The electrical circuit of claim 1 wherein voltage source output voltage includes a target voltage and a small constant voltage related to reflected signals, and wherein the current source factors out the small constant voltage to determine the output current.

11. The electrical circuit of claim 1 further comprising a load resistive element connected to an output of the transmission line, the load resistive element having an impedance substantially equal to the characteristic impedance of the transmission line.

12. A balanced transmission line circuit comprising:
    a transmission line having a characteristic impedance;
    a source circuit comprising:
        a source terminating resistive element with an output side connected to an input of the transmission line, the resistive element having an impedance substantially equal to the characteristic impedance of the transmission line;

a voltage source having an output voltage substantially equal to a target source voltage at the input of the transmission line, wherein the voltage source is connected serially with an input side of the resistive element; and a current source having an output current substantially equal to the output voltage of the voltage source divided by the characteristic impedance of the transmission line, wherein the current source is connected with the output side of the resistive element and drives signal current into the transmission line; and a load circuit comprising a load resistive element connected to an output of the transmission line, the load resistive element having an impedance substantially equal to the characteristic impedance of the transmission line.

13. The balanced transmission line circuit of claim 12 wherein the load circuit further comprises:

a second voltage source having the characteristics of the first voltage source and connected through the load resistive element to the output of the transmission line; and a second current source having the characteristics of the first current source and connected to the output of the transmission line, wherein the second current source provides current for sending a back signal from the output of the transmission line to the input of the transmission line.

14. The balanced transmission line circuit of claim 12 wherein the source circuit, upon coupling to the transmission line, drives an input signal into the transmission line while dissipating substantially no power across the resistive element related to the input signal.

15. The balanced transmission line circuit of claim 12 wherein the source circuit, upon coupling to the transmission line, drives an input signal into the transmission line while dissipating power across the resistive element to terminate one or more reflected signals.

16. An electrical circuit for efficiently driving a transmission line, the transmission line having a characteristic impedance, the circuit comprising:

a source terminating resistive element with an output side connected to an input of the transmission line, the resistive element having an impedance substantially equal to the characteristic impedance of the transmission line;

a voltage source having an output voltage substantially equal to a target source voltage at the input of the transmission line, wherein the voltage source is connected serially with an input side of the resistive element; and a current source having an output current substantially equal to the output voltage of the voltage source divided by the characteristic impedance of the transmission line, wherein the current source is connected with the output side of the resistive element and drives signal current into the transmission line.

17. The electrical circuit of claim 16 wherein the circuit is connected to a transmission line that carries communication signals within a base frequency range and wherein the circuit drives at least one signal at a higher frequency range through the same transmission line in a manner that allows the higher frequency range signal to coexist with the communication signals on the transmission line.

18. The electrical circuit of claim 17 further comprising one or more band separation filters for separating the base frequency range communication signals and the higher frequency range signal.

19. The electrical circuit of claim 16 wherein the source terminating resistive element, the voltage source, and the current source are implemented within a differential drive circuit.

20. The electrical circuit of claim 16 wherein the transmission line includes a conducting element to which the source terminating resistive element and current source are connected and a ground element that is connected to a grounding source.

* * * * *